United States Patent [19]

Scholz et al.

[11] 4,412,408

[45] Nov. 1, 1983

[54] HEAT-INSULATION BUILDING BLOCK OF ALL-METAL CONSTRUCTION

[75] Inventors: Manfred Scholz, Erlangen; Wolfgang-Peter Fricker, Freinsheim, both of Fed. Rep. of Germany

[73] Assignee: Kraftwerk Union Aktiengesellschaft, Ludwigshafen, Fed. Rep. of Germany

[21] Appl. No.: 244,653

[22] Filed: Mar. 17, 1981

[30] Foreign Application Priority Data

Mar. 17, 1980 [DE] Fed. Rep. of Germany ....... 3010256

[51] Int. Cl.³ ............................................... E04C 2/34
[52] U.S. Cl. ........................................ 52/806; 52/573; 52/588
[58] Field of Search ................. 52/785, 805, 806, 573, 52/807, 588, 245, 249; 200/435, 436, 469; 403/331, 363, 364; 181/290, 291

[56] References Cited

U.S. PATENT DOCUMENTS 1,554,774 9/1925 Zahner ............................. 52/807
2,763,321 9/1956 Schuster ............................ 52/245

FOREIGN PATENT DOCUMENTS 294768 7/1967 Australia ............................. 52/588
937493 1/1956 Fed. Rep. of Germany ........ 52/573

Primary Examiner—James L. Ridgill, Jr.
Attorney, Agent, or Firm—Herbert L. Lerner; Laurence A. Greenberg

[57] ABSTRACT

Heat-insulation building block of all-metal construction variable in size and having mutually spaced thermally displaceably mounted metallic insulation foils defining insulation cells therebetween together with spacer elements holding the insulation foils at a distance from one another, as well as metal housing sheets carrying and at least partly enclosing the insulation foils and the spacer elements, including at least two building block parts nested within one another with the metal housing sheets and the insulation foils thereof having a mutual convection-inhibiting sliding fit and, in sliding direction of the mutual sliding fit, the adjacently disposed insulation foils and metal housing sheets having respective overlap lengths greater than a predetermined maximum enlargement of the building block resulting from sliding apart of the building block parts in the sliding direction.

7 Claims, 15 Drawing Figures

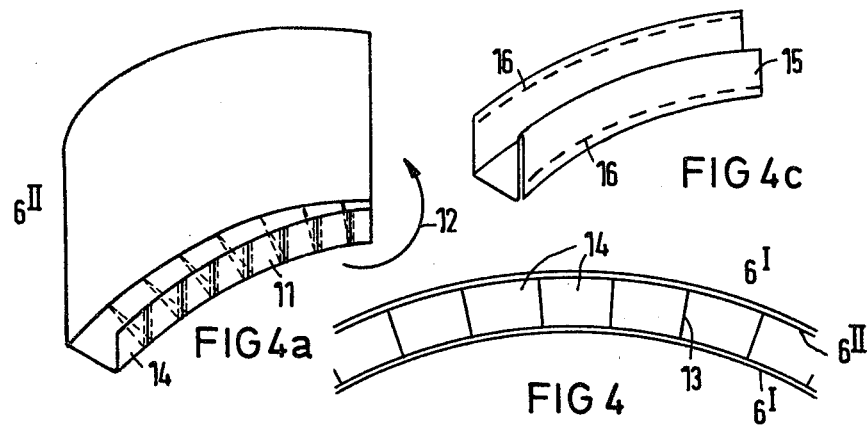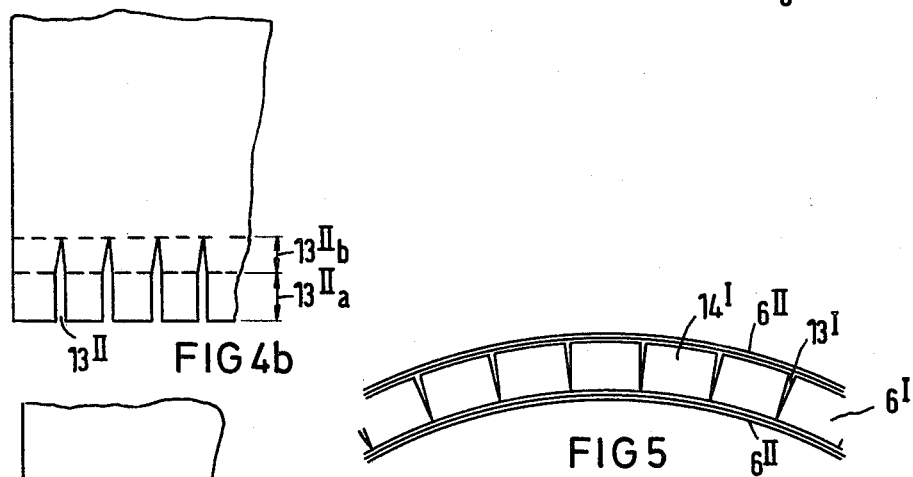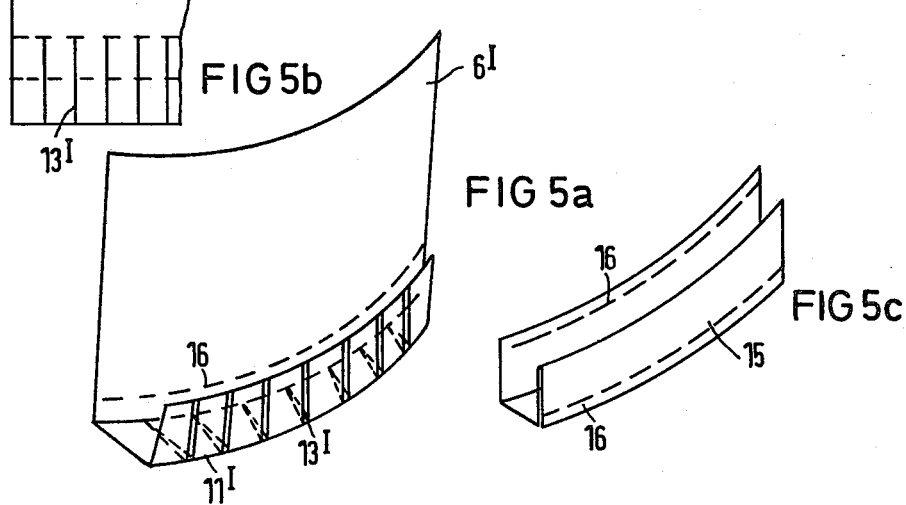

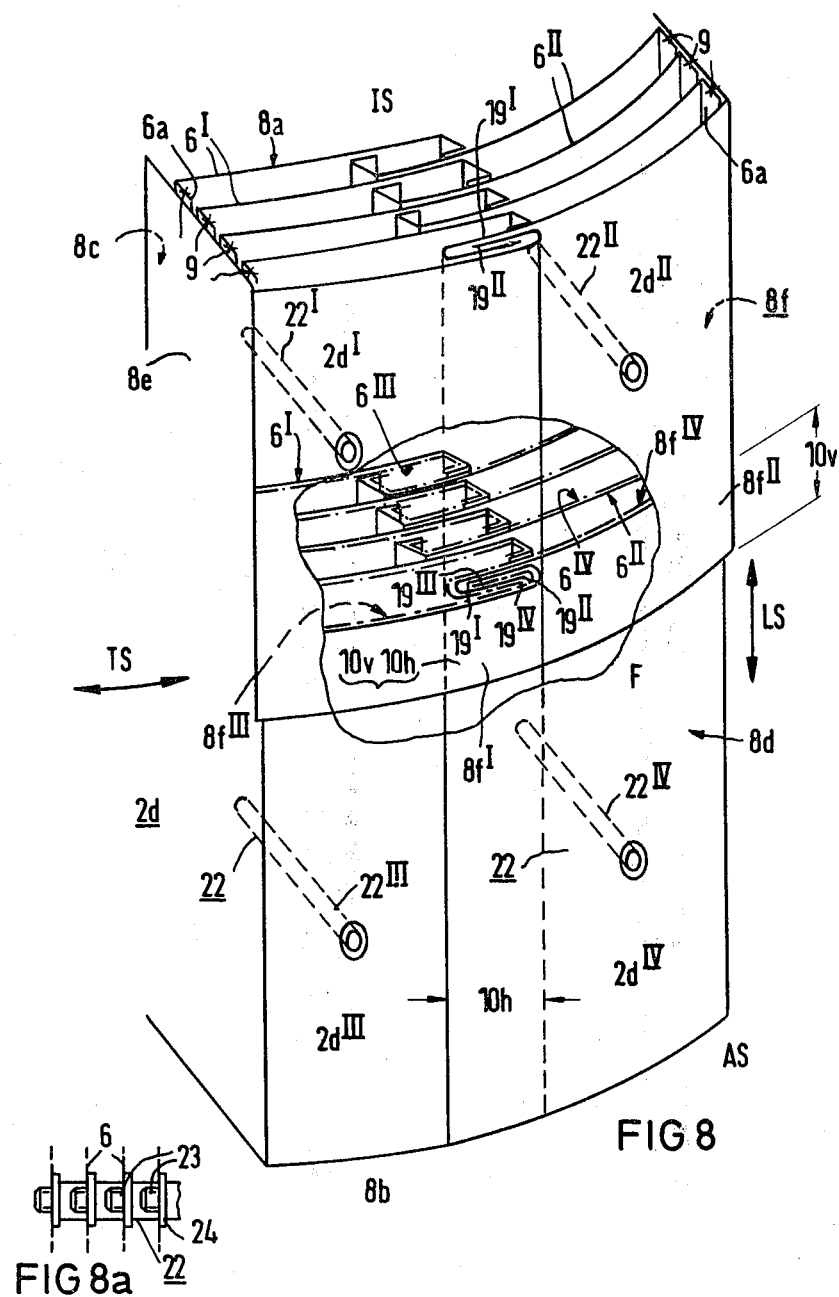

HEAT-INSULATION BUILDING BLOCK OF ALL-METAL CONSTRUCTION

The invention relates to an heat-insulation building block of all-metal construction and, more particularly to such a building block which is variable in size and has mutually spaced thermally displaceably mounted metallic insulation foils defining insulationcells therebetween together with spacer elements holding the insulation foils at a distance from one another, as well as metal housing sheets carrying and at least partly enclosing the insulation foils and the spacer elements.

From German Published Non-Prosecuted Applications (DE-OS) No. 27 34 348 and DE-OD No. 27 29 453, heat-insulating building blocks of all-metal construction have become known heretofore which comprise mutually spaced, heat-movably supported metallic insulation foils for forming interposed insulation cells and, furthermore, spacer elements which hold the insulation foils spaced from one another, as well as housing sheet metal parts which support the insulation foils and the spacer elements and, at least in part, surround them. However, the dimensions of these known heat insulation building blocks i.e. the outer measuremens thereof, cannot be changed, even through they already have in the interior thereof a heat-movable but nevertheless highly convection-proof mounting of the insulation foils, so that stresses and deformation due to inhibited thermal expansion are avoided.

The heat-insulation building blocks according to the invention of the instant application should likewise have the last-mentioned advantageous characteristics i.e. it should be suitable for absorbing the thermal expansion of the component or pipe to be heat-insulated and its own thermal expansion in axial, radial and tengential direction. In addition, it is an object of the invention to provide an heat-insulation building block of the type mentioned at the introduction hereto in such a way that it is suitable for absorbing the following dimensional and manufacturing tolerances:
1. Those of the component to be heat-insulated and those of its own in radial, axial and tangential direction;
2. those of the surrounding internals e.g. those of the biological shield in nuclear reactor plants; and
3. those of the accessories, such as those of the deflection-protection feedthroughs and mountings, for example.

With the foregoing and other objects in view, there is provided, in accordance with the invention, an heat-insulation building block of all-metal construction variable in size and having mutually spaced thermally displaceably mounted metallic insulation foils defining insulation cells therebetween together with spacer elements holding the insulation foils at a distance from one another, as well as metal housing sheets carrying and at least partly enclosing the insulation foils and the spacer elements, including at least two building block parts nested within one another with the metal housing sheets and the insulation foils thereof having a mutual convection-inhibiting sliding fit and, in sliding direction of the mutual sliding fit, the adjacently disposed insulation foils and metal housing sheets having respective overlap lengths greater than a predetermined maximum enlargement of the building block resulting from sliding apart of the building block parts in the sliding direction.

In accordance with an added feature of the invention, the heat-insulation building block being assemblable with like building blocks into an heat insulating and wherein the insulating foils of at least one of the building block parts have bent-away portions at respective free ends thereof bridging the respective insulation cells defined thereby so as to make at least linear, elastically-sealing contact with corresponding bent-away portions of a respective opposing building block part adjacent thereto in direction of thickness of the heat insulation, is provided.

In accordance with yet a further feature of the invention, the respective bent-away portions at the free ends of the insulation foils have doubly bent sections, the double bent sections of the one building block part being disposed substantially point-symmetrically to the double bent sections of the opposed other building block part.

In accordance with a still further aspect of the invention, the insulation foils are curved and are formed with slits in vicinity of the bent-away portions thereof.

In accordance with still an alternate aspect of the invention, there is provided an heat-insulation building block including a backing foil having a thickness considerably smaller than that of the insulation foils, the backing foil covering the insulation foils in vicinity of the bent-away portions thereof.

The advantages obtainable with the invention are especially that the possibility of prefabricating the heat insulation without requiring fine dimensional control is provided. During installation, changes which, according to experience, are very costly, can be eliminated, because the dimensional and manufacturing tolerances are under control. The heat-insulation building block is, furthermore, highly suitable for absorbing the differential expansion of a permanently installed and a removable heat insulation. Such thermal insulation is required especially for primary loop components of nuclear reactor installations, wherein certain parts of the thermal insulation must be detachable and reassemblable for the purpose of in-service tests with ultrasound. As mentioned hereinbefore, dimensional tolerances due to manufacturing can be equalized by the heat insulation building block. Due to the exact fit of the installed heat insulation, hot air convection between the heat insulation and the component or pipe to be heat-insulated is reliably prevented.

Other features which are considered as characteristics for the invention are set forth in the appended claims.

Although the invention is illustrated and described herein as embodied in heat-insulation building block of all-metal construction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description when read in connection with the accompanying drawings, in which:

FIG. 4 is a fragmentary cross sectional view of FIG. 3 taken along the line IV—IV;

FIG. 4a is a perspective view of an individual heat-insulation foil having a double bend or fold therein at the lower edge thereof, for the building block according to FIG. 3;

FIG. 4b is a fragmentary view of a developed projection of the metal foil according to FIG. 4a;

FIG. 4c is a perspective view of a backing sheet of metal, thinner than the metal foil of FIG. 4, for covering the incisions in the bent or folded region thereof;

FIG. 5 is a fragmentary cross sectional view of FIG. 3 taken along the line V—V;

FIG. 5a is a perspective view corresponding to that of FIG. 4a of an individual insulating foil of FIG. 3 wherein, however, the doubly bent or folded marginal region is located on the convex side rather than the concave side thereof;

FIG. 5b is a fragmentary view of a developed projection of the insulating foil according to FIG. 5a;

FIG. 5c is again a perspective view of a very thin backing sheet for covering the slots in the doubly bent or folded marginal zone of the insulating foil according to FIG. 5a;

FIG. 8 is a perspective view, partly broken away, of a combination building block which is variable in size both in axial or vertical direction as well as in tangential or horizontal direction; and FIG. 8a is a fragmentary diagrammatic longitudinal view of a constant spacer such as shown in FIG. 8.

Referring now generally to the figures, it is noted that material specially suitable for the insulation foils and the sheetmetal housing of the heat-insulation building blocks described hereinafter is corrosion-resistant austenitic sheetmetal. The building blocks 2a may, in addition, be welded gas-tightly (impervious to liquids, gases or vapors). The building blocks 2b to 2d may have a spray-proof and largely watertight construction.

Figure 1:
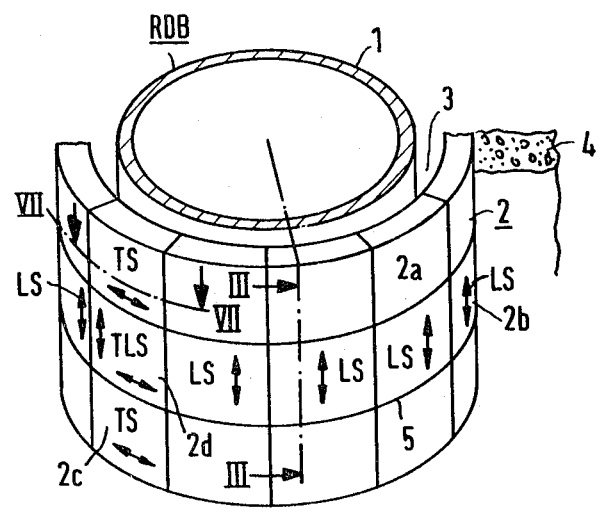
FIG. 1 is a diagrammatic fragmentary perspective view of the heat-insulation of a cylindrical reactor pressure vessel having individual axially and tangentially row-wise assembled heat-insulation building blocks according to the invention, from which parts unnecessary to an understanding of the invention, have been omitted.

Referring now more specifically to FIG. 1 of the drawing, there is shown therein diammagratically a wall 1 of a substantially hollow-cylindrical reactor pressure vessel RDB. Between this wall 1 and the thermal insulation which surrounds the reactor pressure vessel RDB and identified as a whole by reference numeral 2, there is an annular gap 3 which, in the case of pressurized-water reactors serves especially as a cooling air gap and, in the case of boiling-water reactors, as an inspection gap because, in the latter case, the pressure vessel in-service test is performed primarily as a so-called external test. The thermal insulation 2 is made up of individual heat-insulation building blocks or modules 2a, 2b, 2c and 2d of all-metal construction type. The mutually joinable heat-insulating building blocks 2a, hereinafter referred to as standard building blocks in brief, have practically constant size or dimensions in the cold condition thereof and are coupled or fastened to one another and/or to the inner circumference of the biological shield 4 by means of non-illustrated convention coupling and fastening flanges, respectively. In addition, however, the heat-insulation building blocks 2b, 2c and 2d are also installed according to the invention and have a size or dimensions which are variable, namely, the building blocks 2b which form a sliding fit represented by the arrows LS in the longitudinal or vertical direction; the building blocks 2c which form a sliding fit TS in the tangential or horizontal direction; and finally, the building block 2d which forms a sliding fit TLS in the longitudinal direction as well as in the tangential direction and is disposed in vicinity of the intersection of the insulating ring formed by the building blocks 2b with the building blocks 2c, which are stacked on top of one another in vertical direction. The arrows LS, TS and TLS symbolize that, due to the building blocks 2b, 2c and 2d, equalization of manufacturing tolerances in the assembly of the heat insulation as well as equalization of operationally occurring thermal expansion, can be achieved, convection-tight gap-sealing being always maintained in vicinity of the parting gaps 5 between the individual building blocks.

Figure 2:
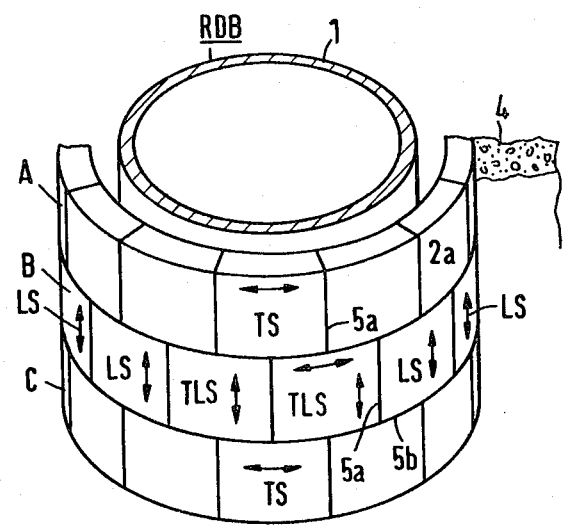
FIG. 2 is another view of FIG. 1 showing a modification of the heat-insulation building block assembly with parting gaps thereof mutually offset by a graduation of half of a building block from building block layer to building block layer.

FIG. 2 illustrates a variation in the arrangement of the heat-insulation building blocks 2 wherein, as in brick masonry, the vertical gaps 5a are shifted relative to one another from layer to layer A, B, C, and so forth, by one-half the building block pitch. The bond of the heat insulation can sometimes be improved thereby with respect to cohesion and convection tightness.

Figure 3:
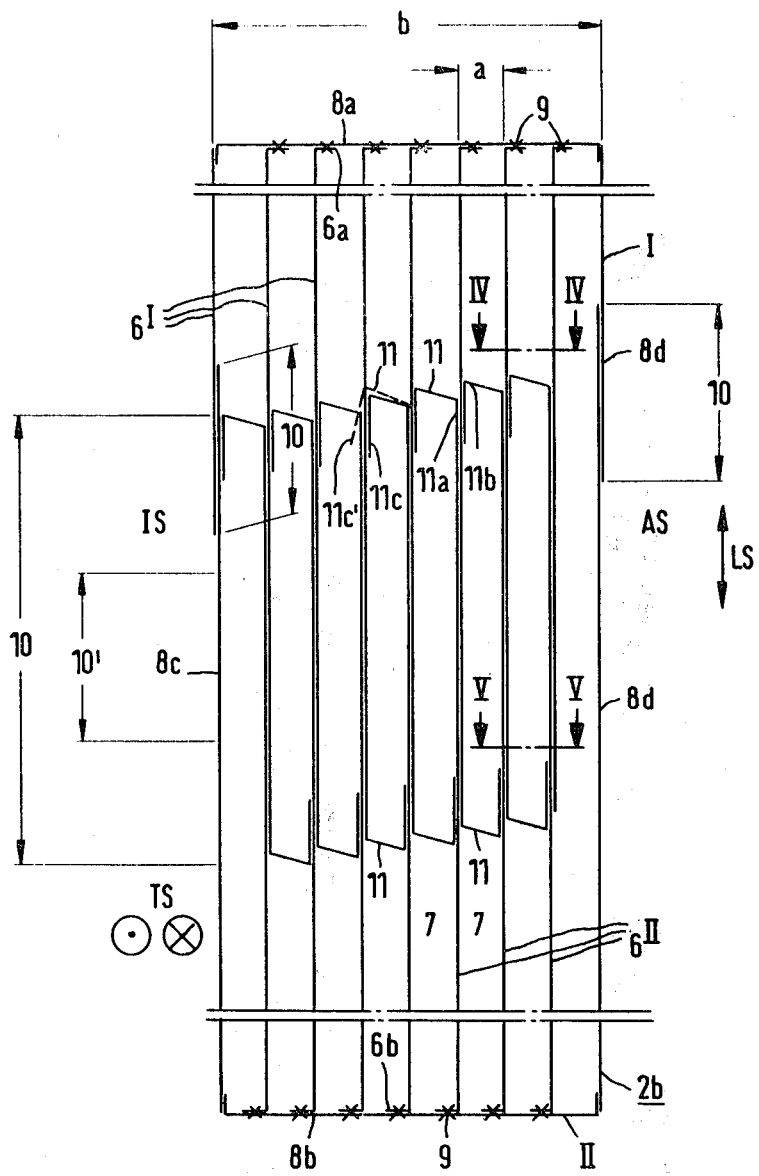
FIG. 3 is an enlarged cross sectional view of FIG. 1 taken along the line III—III and showing an individual heat-insulation building block, the length of which is variable in its axial or vertical direction, as viewed in the figure.

FIG. 3 shows an individual building block 2b which is of all-metal construction type and is variable in size. It has mutually spaced, thermally displaceably supported metallic insulating foils 6 for forming insulating cells 7 therebetween. The so-called cold or outer side AS of the insulation building block faces the biological shield 4, and the so-called hot or inner side IS of the insulation building block faces the reactor pressure vessel RDB. The spacing function is performed, in the embodiment according to FIG. 3 by providing the individual insulating foils 6 with bends or folds at the ends thereof abutting the housing metal sheet 8a at the cover side and the housing metal sheet 8b at the bottom side thereof, the foils 6 being secured by the bent or folded portions 6a and 6b thereof to the housing metal sheets 8a and 8b, respectively, spot welding (note spot welds 9). The insulation thickness of the building block in the insulating direction is equal to the distance b, and the insulation thickness of an individual insulating cell 7 or the spacing of a pair of insulation foils 6 succeeding one another in the insulating direction is equal to the distance a. Besides the housing metal sheets 8a and 8b on the cover and bottom sides, respectively, inner and outer housing metal sheets 8c and 8d can also be seen in FIG. 3 but not the two housing sheets extending in tangential direction.

According to the invention, the building block 2b is formed of two building block parts I and II, which nest together or are boxed one within the other alternatingly with a convection-inhibiting mutual sliding fit by the housing metal sheets 8c and 8d, and also by the lateral housing metal sheets 8e and 8f thereof which are not visible in FIG. 3 but are visible in FIG. 8. In the thrust direction LS of the sliding fit, overlap lengths 10 are provided at the adjacent insulating foils 6 and housing metal sheets 8c and 8d (and, correspondingly, 8e and 8f), which are greater than the predetermined maximum enlargement of the building block 2b resulting from pulling the building block parts I and II apart in the sliding direction LS. In particular, the insulation foils 6 of the building block parts I and II are provided at the free ends thereof with bent-away portions 11 bridging the respective insulation cell 7 in such a manner that they make elastic-sealing and at least linear contact with corresponding bent-away portions 11 at the insulating foils 6 respectively adjacent thereto in direction of the insulation thickness of the complementary or opposite building block part. The bent-away parts 11 according to FIG. 3 are formed as doubly bent or folded portions having bent-away edges or margins 11a and 11b. In unassembled condition, the free legs 11c of the bent-away parts 11 extend somewhat beyond the distance a, as indicated at 11c' by the broken line; they are then deformed elastically and bent inwardly during assembly i.e. when the two building blocks halves I and II are pushed together, so that the elastically-sealing contact occurs in this manner. In the embodiment according to FIG. 3, it is apparent that each of the building block parts I and II is provided, at the free ends of the insulating foils 6 thereof, with the bent-away portions 11, the building block parts I and II pairwise mutually nesting or boxed within one another by the bent-away portions 11 thereof. A double convection seal is thereby attained. It is further apparent that the bent-away parts on the one building block part I are arranged somewhat point-symmetrically or radially to the bent-away portions 11 of the opposed or complementary building block part II i.e. the bent-away parts 11 of both building block halves I and II extend in opposite directions. The individual insulating foils 6 can expand and contract freely, starting from the fastening points 9 thereof at the metal housing sheets 8a and 8b; in the direction of shift LS, additionally, the dimensions or size of the building block 2b may also be varried, the two building block halves I and II being pulled apart or pushed together to a greater or lesser extent, a minimum overlap distance 10' being maintained, however. FIG. 3 in conjunction with FIGS. 1 and 2 therefore shows that the building block 2b serves for adapting or matching thermal insulation 2, which is formed of mutually assemblable heat-insulation building blocks 2a having pratically constant size or dimensions in the cold condition thereof, to the component RDB or pipeline to be insulated, in the axial or vertical direction LS, respectively, and that to this end, in the direction of the insulating thickness DD and in the horizontal or circumferential direction TS, it has fixed dimensions which correspond in the sense mentioned to the dimensionally constant heat insulation building blocks 2a, but is adjustable in the dimensions thereof in the vertical or axial direction LS.

If the radius of curvature of the component to be insulated is very large, the building block 2a can be practically slab-shaped or parallelepipedal. However, if the curvature must be taken into consideration, then the metal housing sheets 8c and 8d and, correspondingly, the insulating foils 6 are curved or arcuate, and the shape of the metal housing sheets 8a on the cover side and 8b on the bottom side is tapered from the outside AS to the inside IS, while the metal housing sheets 8e and 8f (see FIG. 8) extending in tangential direction practically retain the rectangular shape thereof. FIGS. 4 to 4c show details of the construction of the insulation foils 6 in the vicinity of the bent-away portions 11 thereof for the case that the bent-away portions 11 are disposed on the concave side of the insulating foils 6. This concerns the insulating foils 6 of the lower building block half II, which is identified by the reference character $6^{II}$. The insulating foil $6^{II}$ is shown upside down in FIG. 4a for simpler presentation; the correct assembled position thereof according to FIG. 3 is obtained if it is brought into the upright position, in accordance with the curved arrow 12, wherein the bent-away portions are at the top. To make the formation of the bent-away parts 11 possible even if the insulating foil $6^{II}$ is curved, the latter is provided with slots 13 in vicinity of the bent-away portions; note also the development according to FIG. 4b. In the fully bent-away and curved condition according to FIG. 4a, the tabs 14 formed by the slots 13 then abut one another in flush engagement and with the correct dimensions, so that the convection tightness (note FIG. 4) is practically unimpaired. For complete convection sealing, however, one can further form lockingly slide a backing foil 15 with less wall thickness than that of the insulating foils 6 tightly-fitting over the bent-away parts 11 and join it to the insulating foils $6^{II}$ by means of spot or seam welding within the regions indicated by the broken lines 16. As shown in FIG. 4b, the slots are made wider in the region $13^{IIa}$ and then converge at an acute angle in the region $13^{IIb}$. This form is chosen because the edges of the slots are then closed in accordance with FIG. 4 when the structure is bent into the curved shape according to FIG. 4a.

FIGS. 5 to 5c show the situation in the region of the bent-away parts $11^I$ of an insulating foil $6^I$, wherein it is evident that the bent-away portions are disposed on the convex side of the insulating coil $6^I$. In this regard, the slots $13^I$ are formed as simple incisions, note FIG. 5b. If the insulating foil $6^I$ is then provided with the bent-away portions $11^I$ thereof and bowed into the arcuate shape, gaps $13^I$ with an acuate-angle aperture are formed in the region of the bent-away parts 11. These gaps $13^I$ can again be covered up completely by the application of a backing foil 15 (FIG. 5c), so that the convection tightness is not impaired.

Figure 6:
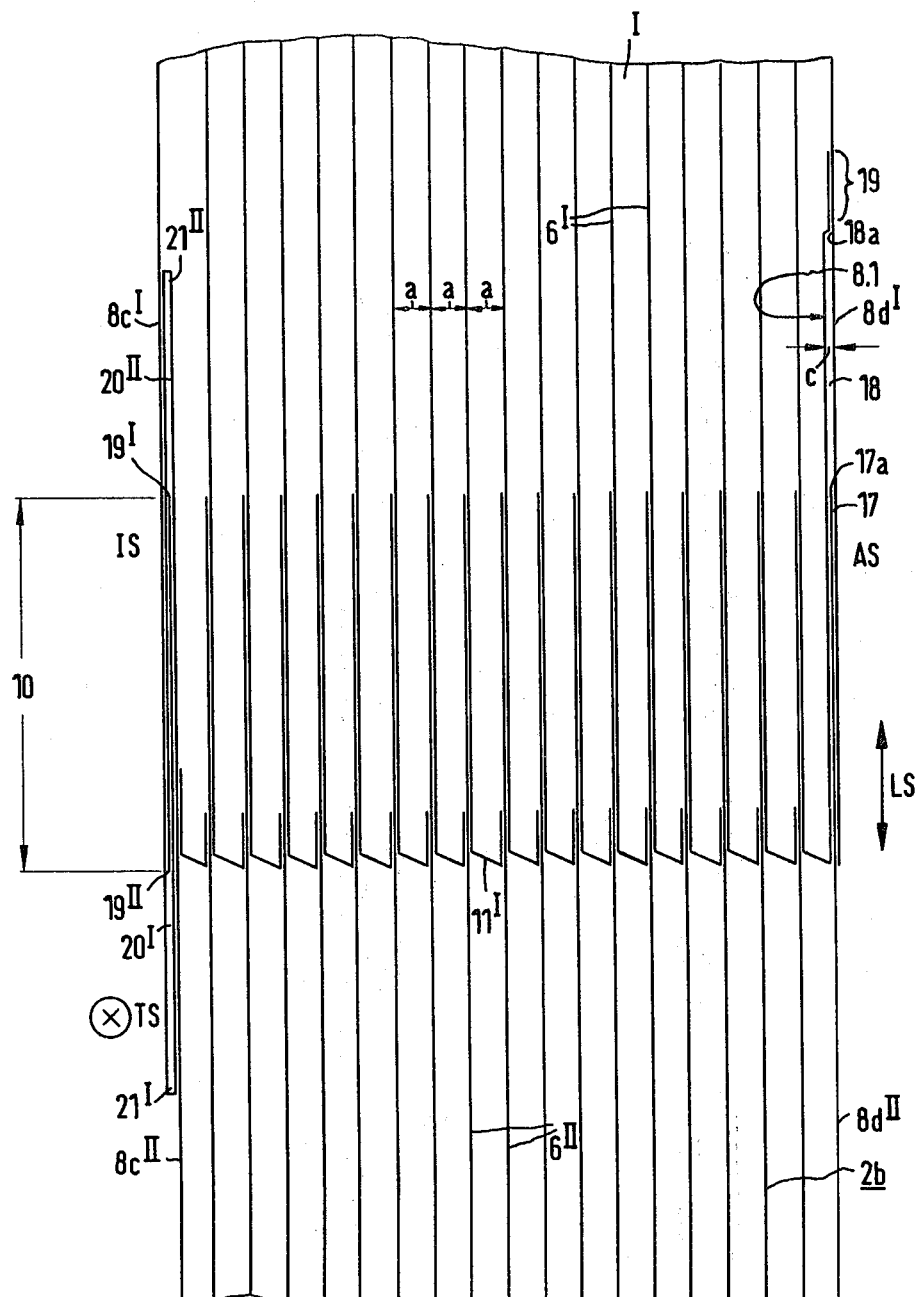
FIG. 6 is a view similar to that of FIG. 3 of a second embodiment of the heat-insulation building block wherein the insulation foils, which are slidable along one another, are doubly bent or folded at the lower edge or margin thereof only for the one building block half, the convection sealing of the sheetmetal housing parts also being shown.

FIG. 6 shows a second embodiment of the insulation building block of the invention which is simplified with respect to the construction of the insulation foil. Only the insulation foils $6^I$ are provided with the bent-away portions $11^I$, while the insulating foils $6^{II}$ terminate smoothly at the ends thereof and are not bent-away respectively. The overlap section between the insulating foils $6^I$ and $6^{II}$ is again identified by reference numeral 10. However, the construction of the convection seal at the metal housing sheets 8c and 8d is improved. In the right-hand half of FIG. 6, there is shown in the region of the outer side AS that the housing sheets $8d^{II}$ and $8d^I$ of the building block parts II and I mutually engage with a sliding fit via a blade or tongue 17 and a pocket 18 formed by doubling the metal sheet; the stoppage of the blade 17 at the respective bottom 18a of the pocket defines the minimum dimension or size of the building block 2b in the direction of thrust LS. As is evident, the pocket 18 is formed by joining a metal housing sheet 8.1, offset in the upper marginal area thereof, to the outer sheet $8d^I$ in the region 19 by spot or seam welding. The spacing between the sheet layers 8.1 and $8d^I$ is the distance c and is chosen so that a convection-proof sliding fit is possible.

In the left-hand part of FIG. 6 (inner side IS), the maximum dimension of the building block 2b in the thrust direction LS is defined by the mutual engagement of metal housing sheet blades or tongues $19^I$ of the building block I and $19^{II}$ of the building block II, on the one hand, in pockets $20^{II}$ of the part II and $20^I$ of the part I, on the other hand, formed by bent-away portions with a hair pin-shaped cross section. The hair pin-shaped bent-away portions of the metal housing sheet $8c^I$ are identified by reference character $21^I$ and those of the part $8c^{II}$. In the manufacture of shuch a building block according to FIG. 3 or FIG. 6, the procedure which is advantageously followed is that the metal housing sheets extending in the tangential direction TS i.e. into and out of the plane of the drawing as indicated by the encircled dot and cross in FIGS. 3 and 6, are not yet attached, so that the two building block halves I and II are still open on these sides 8e and 8f (see FIG. 8) and can be slid into one another. Since no convection takes place in this tangential or horizontal direction normally because there are no temperature differences in this direction, the building blocks can be left open in this direction. However, if protection against spraying is to be ensured, for example, it is possible, after the building block halves I and II have been pushed together, also to cover up the side surfaces extending in the TS-direction with metal housing sheets, which must be provided with a convection-proof blade or tongue and pocket engagement in accordance with the representation of the metal housing sheets 8c, 8d in FIGS. 3 and 6. As mentioned hereinbefore, the building block according to FIG. 6 cannot be drawn apart farther in the thrust direction LS than to the location at which the pocket bottom $21^I$ comes to a stop against the blade or tongue end $19^{II}$ and the pocket bottom $21^{II}$ against the blade or tongue end $19^I$. On the other hand, the minimum dimension of part 2b in the movement direction LS is defined by the distance of the blade or tongue end 17a from the pocket bottom 18a on the side AS.

Figure 7:
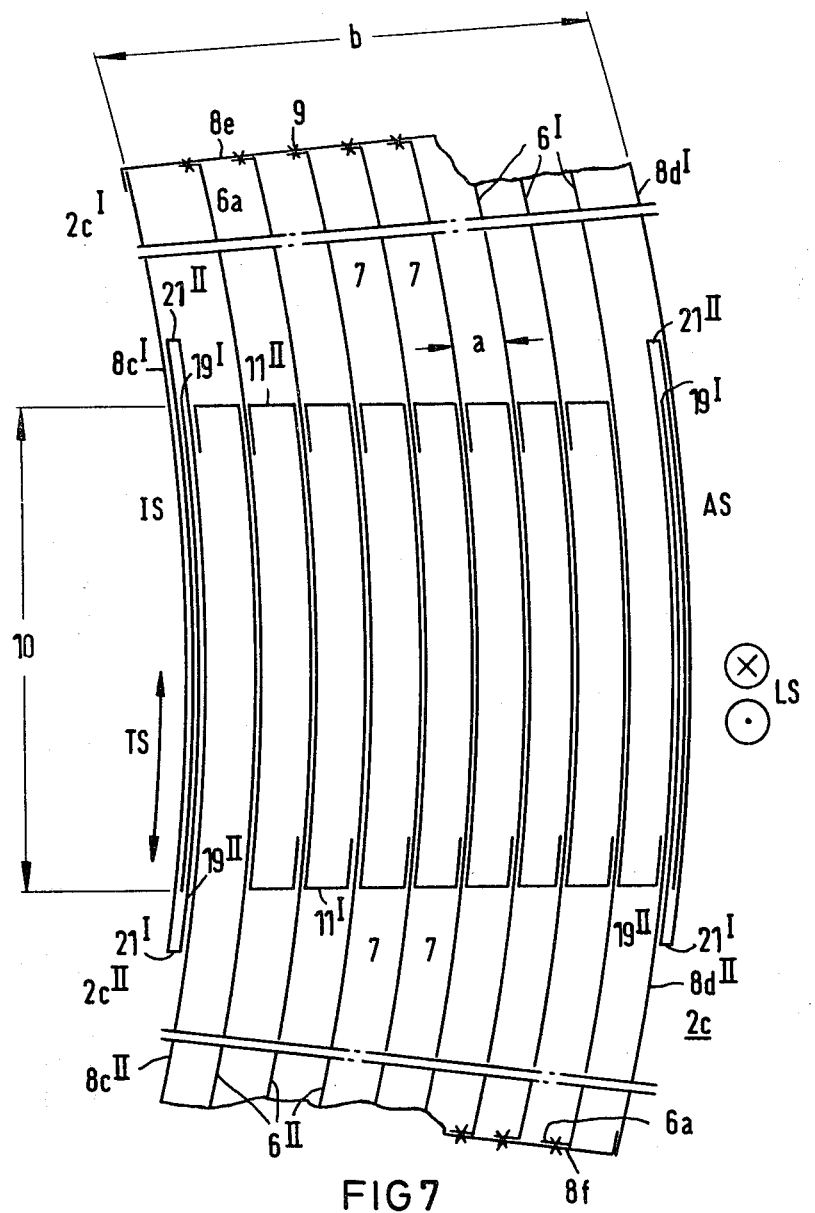
FIG. 7 is an enlarged fragmentary cross sectional view of FIG. 1 taken along the line VII—VII and showing a heat-insulation building block, the dimensions of which are variable in tangential or horizontal direction.

FIG. 7 is a fragmentary cross-sectional view of FIG. 1 taken along the line VII—VII in the direction of the arrows. Again, two building block halves I and II of a building block 2c serving as a sliding tangential cassette are shown in part. The tangential direction of movement is again represented by a double-headed arrow TS and the longitudinal direction of movement by the encircled dot and cross LS, shich symbolize an arrow head and an arrow tail, respectively. The engement of the metal housing sheets $8c^I$ and $8c^{II}$ as well as $8d^I$ and $8d^{II}$, respectively, on the inner side IS and on the outer side AS is as shown in the left-hand part (IS) of FIG. 6. Corresponding parts are therefore provided with the same reference characters. The mutual engagement of the insulation foils $6^I$ and $6^{II}$, in principle, as already explained in connection with FIG. 3; the overlap section is therefore again identified by reference numeral 10. The insulating foils 6 or $6^I$ and $6^{II}$, respectively, are again advantageously provided with bent-away portions 6a at the ends thereof facing the lateral metal housing sheets 8e and 8f and are fastened by these bent-away portions 6a to the inner sides of the metal housing sheets 8e and 8f by spot welding (spot welds 9). Thereby, the fixed point of the thermal expansion for the insulating foils 6, the latter being thermally expansible, is defined again, which can expand with the free ends thereof unimpeded and engaging by the bent-away portions 11 or $11^I$, $11^{II}$ thereof against the adjacent insulating foils 6 so as to form a sliding fit with elastic sealing. The building block 2c according to FIG. 7 is thus provided for adapting or accommodating the heat insulation 2 (FIG. 1) to the component to be insulated (or a non-illustrated pipe line, respectively) in the horizontal or tangential direction TS, for which purpose the size or dimensions of this building block 2c are adjustable within the overlap length 10 in the horizontal or tangential direction TS by pushing them together or pulling them apart.

FIG. 8 shows in a perspective view an axially or tangentially sliding cassette 2d, which is symbolized in FIGS. 1 and 2 by the arrows representing the combined direction of movement TLS. This combination building block can also be visualized as having been produced when the two building block halves $2d^I$ and $2d^{II}$ form a sliding fit in the tangential direction TS in the manner of FIG. 7 and, correspondingly thereto, the two building block halves $2d^{III}$ and $2d^{IV}$ form a similar sliding fit. The two lower building block halves (which properly should now be called quadrants) are formed with such dimensions, however, that the building block half $2d^{III}/2d^{IV}$ can be slid in the direction of movement LS into the building block half $2d^I/2d^{II}$ and forms a sliding fit also in this direction of movement. In the interest of greater clarity, the metal housing sheet for the housing cover surface 8a has been omitted and, further, the sliding fit is shown in a so-called phantom view in the middle region of the combination building block 2d. It is thus evident from FIG. 8 that two pairs of building blocks $2d^I/2d^{II}$ and $2d^{III}/2d^{IV}$ are nested together or boxed one within the other by the insulating foils 6 thereof, or more specifically the foils $6^I$, $6^{II}$, $6^{III}$ and $6^{IV}$, and the metal housing sheets 8c, 8d, 8e, 8f and non-illustrated 8a and 8b, for forming a combination building block 2d, the dimensions of which adjustable in the horizontal or tangential directions TS as well as in the vertical or axial direction LS.

So-called spacers are designated as a whole by reference character 22 and for the individual quadrants by $22^I$, $22^{II}$, $22^{III}$ and $22^{IV}$, respectively. These are structural elements such as are shown in detail in FIG. 3, for example, of German Published Non-Prosecuted Application No. 26 24 634. They are threaded members formed of heat-retarding, pressure-resistant material, such as austenite, for example, which are provided, respectively, at one end thereof with an externally threaded pin 22a and, at the other end thereof, with a tapped hole 22b, the members being inserted between two mutually adjacent foils 6 and passing with their screw threads through coaxial holes 23 in the foils 6. FIG. 8a shows diagrammatically a portion of such a spacer 22. The torsion stiffness and the compression strength of the building block halves 2d are especially improved by these spacers 22. This is important in those cases where the building blocks are sujected to mechanical stresses. Thus, vertical tracks are arranged, for example, at the inside circumference of the insulation 2 (see FIGS. 1 and 2) to support ladders running on rollers thereon. In this manner, every location on the outer wall of the reactor pressure vessel 1 is accessible by operating personnel (in radiation protection suits). The spacers 22 ensure protection against bulging or denting of the individual building blocks and are then provided at every individual building block 2a, 2b, 2c or 2d. In case the hereinaforedescribed mechanical stresses do not exist or occur, the spacers can also be omitted, which means a simplification in the construction and manufacture. As shown further in FIG. 8a, collars 24 are provided at the individual threaded members, each foil 6 being clamped between the collar 24 of the one threaded member and the end of the tapped hole of the adjacent member.

Although the building blocks according to the invention, in the form of sliding cassettes, are represented as being applied to the thermal insulation of a reactor pressure vessel RDB in FIGS. 1 and 2, it is understood that the reactor pressure vessel can also be replaced by a pipeline or another component. The sliding fit which shows up to advantage in the manufacture and installation as well as in the expansion and shrinkage occurring in operation, provides improved sealing in the gap area. Due to the all-sided overlap of the foils 6 and the metal housing sheets 8, noninsulated gaps in the expansion region are reliably avoided.

It should further be mentioned that, in FIG. 8, the spot welds between the metal housing sheets and the bent-away portions 6a of the metal foils 6 are again identified by the reference numeral 9, and the housing sheet metal tabs or tongues $19^I$, $19^{II}$, $19^{III}$ and $19^{IV}$ of the sliding pocket or fold engagement have eight successive housing sheet tab parts, as shown in the broken-away region F, which can slide on each other in the double overlap region 10v, 10h. The single overlap regions are identified by reference characters 10v (LS-direction) and 10h (TS-direction).

There are claimed:

1. Heat-insulation building block formed of at least two parts slideable relative to one another over a given range and, respectively, including between two metal housing sheets maintained at a constant spacing from one another, a multiplicity of metallic insulation foils disposed consecutively in direction of said spacing between said housing sheets, and spacer elements holding the insulation foils in spaced relationship to one another, adjacent pairs of the consecutive insulation foils forming respective insulation cells, the housing sheets and the insulation foils of the respective parts being nested overlappingly within one another in consecutive alternating fashion within the given sliding range, the housing sheets and the insulation foils of the slideable parts nested within one another having respective overlap lengths greater than a maximum enlargement of the building block resulting from sliding the parts of the building block apart in direction of the given sliding range, comprising bent-away portions formed at a free end of the insulation foils of at least one of the relatively slideable building-block parts, said bent-away portions bridging the space between respective pairs of the consecutive insulation foils and tightly engaging elastically respective adjacent insulation foils of at least the other of the relatively slideable building-block parts, and hairpin shaped bent-away portions formed as pockets engaging in one another at free ends of the housing sheets of the two building-block parts forming the building block.

2. Heat-insulation building blocks according to claim 1 wherein the insulation foils of each of said building block parts have bent-away portions at respective free ends thereof, and said building block parts are pairwise, mutually nested with said bent-away portions thereof within one another.

3. Heat-insulation building block according to claim 1 wherein the respective bent-away portions at said free ends of said insulation foils have doubly bent sections, the doubly bent sections of the one building block part being disposed substantially point-symmetrically to the doubly bent sections of the opposed other building block part.

4. Building block according to claim 1 being formed of four parts and comprising two of said two-part building blocks with said insulating foils and said housing sheets thereof nested within one another with alternating sides.

5. Heat-insulation building block according to claim 1 including a backing foil having a thickness considerably smaller than that of said insulation foils, said backing foil covering said insulation foils in vicinity of said bent-away portions thereof.

6. Building block according to claim 1 having a circularly bent configuration for thermally insulating a cylindrical object, wherein the building-block parts are relatively slideable in circumferential direction of the cylindrical object.

7. Building block according to claim 6 wherein said insulation foils are slotted in vicinity of said bent-away portions thereof.

* * * * *